United States Patent [19]
Foti

[11] Patent Number: 5,577,103
[45] Date of Patent: Nov. 19, 1996

[54] METHOD OF PROVIDING SERVICE INFORMATION TO SUBSCRIBERS IN A CELLULAR TELECOMMUNICATIONS NETWORK USING THE SHORT MESSAGE SERVICE (SMS)

[75] Inventor: George Foti, Dollard des Ormeaux, Canada

[73] Assignee: Telefonaktiebolaget LM Ericsson, Stockholm, Sweden

[21] Appl. No.: 401,884

[22] Filed: Mar. 10, 1995

[51] Int. Cl.$^6$ .................................................. H04Q 7/00
[52] U.S. Cl. ................................................ 379/59; 379/63
[58] Field of Search ......................... 379/58, 211, 212, 379/210, 201, 59, 63; 455/33.1

[56] References Cited

U.S. PATENT DOCUMENTS

| | | | |
|---|---|---|---|
| 4,942,540 | 7/1990 | Black et al. | 364/514 |
| 5,043,983 | 8/1991 | Dorst et al. | 370/110.1 |
| 5,181,239 | 1/1993 | Jolissaint | 379/96 |
| 5,329,578 | 6/1994 | Brennan et al. | 379/211 X |
| 5,479,476 | 12/1995 | Finke-Anlauff | 379/58 |

OTHER PUBLICATIONS

The GSM Short Message Service, Kevin Holley, Cellnet, p. 7/3.

Primary Examiner—Curtis Kuntz
Assistant Examiner—Lisa M. Coward
Attorney, Agent, or Firm—Smith & Catlett, P.C.

[57] ABSTRACT

A method of providing a subscriber in a cellular telephone network with information from a subscriber service profile. The network includes a mobile station having a visual display, a mobile switching center (MSC), and a home location register (HLR) for storing the subscriber service profile. A request for the service profile information is transmitted from the mobile station to the mobile switching center and the home location register. The mobile switching center retrieves the service profile information from the home location register. The service profile information is appended to a short message service (SMS) message which is transmitted from the mobile switching center to the mobile station. The service profile information is then provided in a voice message or displayed on the visual display of the mobile station.

6 Claims, 2 Drawing Sheets

METHOD OF PROVIDING SERVICE INFORMATION TO SUBSCRIBERS IN A CELLULAR TELECOMMUNICATIONS NETWORK USING THE SHORT MESSAGE SERVICE (SMS)

BACKGROUND OF THE INVENTION

1. Technical Field of the Invention

This invention relates to radio telecommunication systems and, more particularly, to a method of providing status information regarding activated services to subscribers of a cellular telecommunications network.

2. Description of Related Art

In modem cellular telecommunication networks, the networks are divided into cells which service a defined area for mobile stations. Each cell contains a base station which transmits and receives voice and control information to and from mobile stations (mobile phones) which are located within the cell's coverage area. Each of the cells employs a separate control channel for relaying control information to mobile stations, and voice channels for relaying voice information.

The control channel, whether analog or digital, performs the function of providing access for mobile subscribers to services provided by cells within a cellular telecommunications network. Analog control channels are described in the Advanced Mobile Telephone Service (AMPS) or IS-553 analog air interface specification which is hereby incorporated by reference herein. The current version of the cellular industry standard for a Digital Control Channel (DCCH) is described in Project No. 3011-2 of the EIA/TIA Interim Standard IS-54-C, "Cellular System Dual-Mode Mobile Station—Base Station Compatibility Standard", dated Apr. 8, 1994. The IS-54-C specification comprises two distinct parts:

IS-54.1—This part specifies the operation of the digital control channel and is organized in accordance with the general concept of protocol layering; and IS-54.2—This part specifies the modified operation of the analog control channel and traffic channels required in support of new functionality, such as short message service (SMS) operation.

The IS-54-C specification, including IS-54.1 and IS-54.2, is hereby incorporated by reference herein.

Today's standards offer mobile telephone subscribers a great deal of flexibility in transferring calls to other numbers. For example, a subscriber may transfer a call to fixed number services, variable number services, or voice mail transfer services. Each of these call-transfer services has a different priority, thus allowing subscribers to assign different forward-to numbers (C-numbers) to different call-transfer services, depending on the priority they desire.

Flexibility, however, also results in complexity in existing cellular telephone systems. In addition to assigning a call-transfer service for each C-number, subscribers must also individually activate or deactivate each call-transfer service. Many subscribers may forget the current state of their call-transfer services (i.e., whether a particular call-transfer service has a C-number assigned; if so, which C-number is assigned; and whether the call-transfer service is activated or deactivated). To obtain status information of call-transfer services, subscribers must call their telephone service provider and request an agent to access their profile and tell them the current status. Instead, subscribers sometimes try to guess the current state, and if a subscriber guesses wrong, calls may be missed or routed to the wrong C-number.

Although there are no known prior art teachings of a solution to the aforementioned deficiency and shortcoming such as that disclosed herein, a number of prior art references exist that discuss subject matter that bears some relation to matters discussed herein. Such prior art references are U.S. Pat. No. 5,181,239 to Jolissaint, and U.S. Pat. No. 5,043,983 to Dorst et al. Each of these references is discussed briefly below.

U.S. Pat. No. 5,181,239 to Jolissaint (Jolissaint) discloses a method and apparatus in a wireline telephone system which maintains a database record relating to a caller at a switching machine. Portions of the caller information may be visually displayed to agents on display telephones attached to the switch. However, Jolissaint does not in any way teach or suggest a method by which a caller may access and retrieve his caller-related information and display such information on the caller's own telephone. In addition, Jolissaint is limited to a wireline telephone system, and does not suggest how such a method could be implemented in a cellular telephone system.

U.S. Pat. No. 5,043,983 to Dorst et al. (Dorst) discloses a system in which an intelligent telephone is connected to a central telephone office over an integrated services digital network (ISDN) basic rate interface (BRI). At the conclusion of an operator-assisted call, a data block comprising time and charges information is sent over the BRI to the intelligent telephone. The telephone then displays this information on a visual display to the caller. Dorst, however, is limited to a wireline telephone system, and does not suggest how such a system could be implemented in a cellular telephone system. In addition, Dorst does not teach or suggest any method of retrieving other caller information such as the status of call-transfer services, as disclosed herein.

Review of each of the foregoing references reveals no disclosure or suggestion of a method such as that described and claimed herein.

It would be a distinct advantage to have a method in a cellular telephone network for displaying on a subscriber's mobile telephone display, the current status of the subscriber's telephone services. Such a method would enable the subscriber to display, upon registration and upon demand, the services that are currently active, and, in the case of call-transfer services, the C-numbers assigned to each service. This relieves the subscriber of the burden of having to remember the status of his/her services, and reduces the possibility of calls being missed or routed to the wrong C-number. The present invention provides such a method.

SUMMARY OF THE INVENTION

The present invention is a method of providing a subscriber in a cellular telephone network with information from a subscriber service profile. The network includes a mobile station having a visual display, a mobile switching center, and a home location register for storing the subscriber service profile. The method begins by transmitting a request for the service profile information from the mobile station to the mobile switching center and the home location register. The mobile switching center retrieves the service profile information from the home location register. The service profile information is appended to a short message service (SMS) message which is transmitted from the mobile switching center to the mobile station. The service profile information is then displayed on the visual display of the mobile station.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

In the system of the present invention, short message service (SMS) update messages, with current feature setting information, are received by mobile telephone subscribers. The subscribers can then review their subscriber profile, as contained in the update message, and ensure that the settings meet their current needs. If a subscriber's needs differ, the subscriber may change his current settings in order to avoid missing calls or routing calls to the wrong C-number.

The SMS update message is sent to the subscriber under the following circumstances:

(1) Upon initial power-on registration of the subscriber's mobile telephone;

(2) Whenever a subscriber makes a change to a feature; or (3) Whenever a subscriber requests to see his service profile information by entering a feature code through his mobile station.

Although the preferred embodiment of the present invention retrieves and displays the status of call-transfer services, it should be understood that this embodiment is exemplary only, and the invention is not limited to the retrieval and display of call-transfer services, but may retrieve and display other types of information as well. In addition, the invention is not limited to visually displaying the information to the subscriber, but may also relay the information to the subscriber by voice message or other suitable means.

Figure 1:
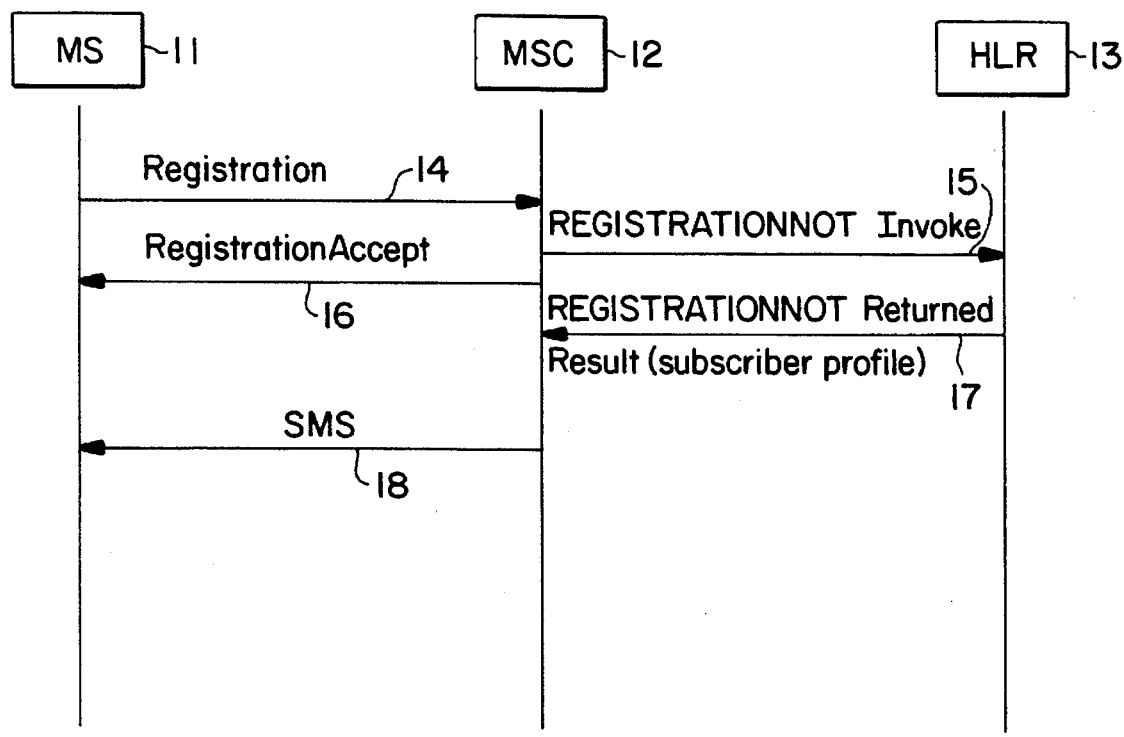
FIG. 1 is a message flow diagram illustrating the messages utilized in the preferred embodiment of the present invention to retrieve a subscriber service profile upon initial registration of the subscriber.

FIG. 1 is a message flow diagram illustrating the messages utilized in the preferred embodiment of the present invention to retrieve a subscriber service profile upon initial registration of the subscriber. The messages are sent between a mobile station (MS) 11, a mobile switching center (MSC) 12, and a home location register (HLR) 13, all of which are well known in the art. The HLR 13 includes a database of subscriber information, including the status of various call-transfer services, which may be retrieved as a subscriber profile.

When the mobile station 11 is first turned on, it transmits a registration request message 14 to the MSC 12 serving the mobile station's operating area. The registration request message 14 includes an identification of the mobile station 11. The MSC 12 sends a REGISTRATIONNOT Invoke message 15 to an associated HLR 13 to ascertain the status of the subscriber associated with the mobile station 11 requesting registration. The HLR 13 notifies the MSC 12 whether or not the subscriber is an authorized user, and if authorized, the MSC 12 returns a RegistrationAccept message 16 to the mobile station 11.

In the preferred embodiment of the present invention, several additional steps are taken in order to automatically provide the subscriber with the status of call-transfer services upon registration. First, the HLR 13 appends subscriber profile information, including call-transfer service status, to a REGISTRATIONNOT Returned Result message 17 returned to the MSC 12 in response to the REGISTRATIONNOT Invoke message 15 from the MSC. Thereafter, the MSC 12 sends a short message service (SMS) message 18 to the mobile station 11. The SMS message 18 includes call-transfer service status information which is then displayed on the mobile station's visual display for the subscriber.

Figure 2:
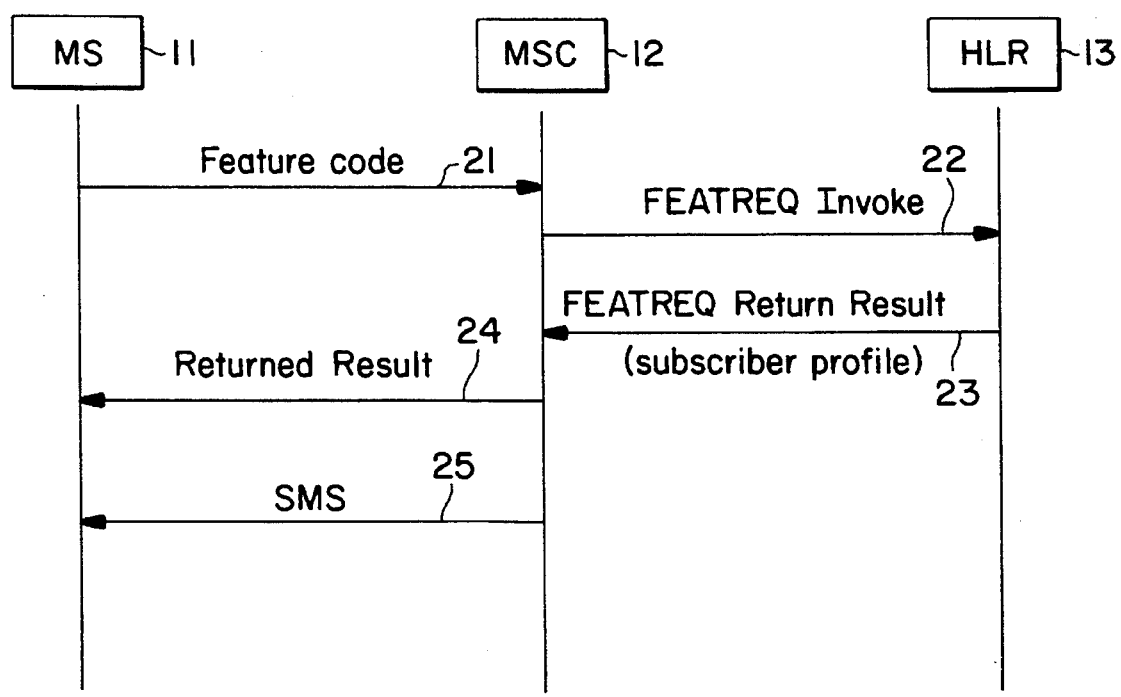
FIG. 2 is a message flow diagram illustrating the messages utilized in the preferred embodiment of the present invention to retrieve a subscriber service profile when a subscriber enters a feature code requesting the service profile.

FIG. 2 is a message flow diagram illustrating the messages utilized in the preferred embodiment of the present invention to retrieve a subscriber service profile when a subscriber enters a feature code requesting the service profile. FIG. 2 also illustrates the message flow when a subscriber makes a change to a feature or service stored in the HLR 13. Like FIG. 1, the messages in FIG. 2 are sent between a mobile station (MS) 11, a mobile switching center (MSC) 12, and a home location register (HLR) 13. Initially, a subscriber enters a feature code 21 requesting service profile information or changing a feature stored in the HLR 13. The feature code 21 is transmitted from the mobile station 11 to the MSC 12. The MSC 12 responds by sending a FEATREQ Invoke message 22 to the associated HLR 13 requesting that the profile of subscriber features be returned. The HLR 13 responds by returning to the MSC 12 a FEATREQ Return Result message 23 to which the HLR has appended the requested subscriber profile information. The MSC 12 then sends a Returned Result message 24 to the mobile station 11, and follows this with a SMS message 25. The SMS message 25 includes call-transfer service status information which is then displayed on the mobile station's visual display for the subscriber.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of providing a subscriber in a cellular telephone network with information from a subscriber service profile, said network including a mobile station, a mobile switching center, and a home location register for storing said subscriber service profile, said method comprising the steps of:

automatically transmitting a request for said service profile information from said mobile station to said mobile switching center and said home location register upon initial power-on registration of said subscriber's mobile station;

retrieving said service profile information from said home location register;

appending said service profile information to a short message service (SMS) message;

transmitting said short message service message from said mobile switching center to said mobile station; and relaying said service profile information to said subscriber.

2. The method of providing a subscriber in a cellular telephone network with information from a subscriber service profile of claim 1 wherein said mobile station includes a visual display and said step of relaying said service profile information to said subscriber includes displaying said service profile information on said visual display of said mobile station.

3. The method of providing a subscriber in a cellular telephone network with information from a subscriber service profile of claim 1 wherein said step of relaying said service profile information to said subscriber includes providing said service profile information in a voice message to said subscriber.

4. A method of providing a subscriber in a cellular telephone network with information from a subscriber service profile, said network including a mobile station, a mobile switching center, and a home location register for storing said subscriber service profile, said method comprising the steps of:

automatically transmitting a request for said service profile information from said mobile station to said mobile switching center and said home location register whenever said subscriber makes a change to a feature stored in said home location register;

retrieving said service profile information from said home location register;

appending said service profile information to a short message service (SMS) message;

transmitting said short message service message from said mobile switching center to said mobile station; and relaying said service profile information to said subscriber.

5. The method of providing a subscriber in a cellular telephone network with information from a subscriber service profile of claim 4 wherein said mobile station includes a visual display and said step of relaying said service profile information to said subscriber includes displaying said service profile information on said visual display of said mobile station.

6. The method of providing a subscriber in a cellular telephone network with information from a subscriber service profile of claim 4 wherein said step of relaying said service profile information to said subscriber includes providing said service profile information in a voice message to said subscriber.

* * * * *